(12) United States Patent
Yu

(10) Patent No.: US 6,517,169 B1
(45) Date of Patent: Feb. 11, 2003

(54) SPOKED WHEEL FOR A BICYCLE

(76) Inventor: Mark Yu, 9F, No. 83, Wu-Chuan-Hsi-San St., Hsi Dist., Taichung City (TW)

( * ) Notice: Subject to any disclaimer, the term of this patent is extended or adjusted under 35 U.S.C. 154(b) by 0 days.

(21) Appl. No.: 10/105,945

(22) Filed: Mar. 26, 2002

(51) Int. Cl.$^7$ .............................. B60B 27/00; B60B 1/06
(52) U.S. Cl. ...................... 301/110.5; 301/104; 301/74; 301/67
(58) Field of Search ............................. 301/104, 110.5, 301/110.6, 80, 81, 74, 67, 68, 69, 70, 71

(56) References Cited

U.S. PATENT DOCUMENTS

| | | | | |
|---|---|---|---|---|
| 436,993 A | * | 9/1890 | Overman ..................... | 152/327 |
| 1,934,102 A | * | 11/1933 | Stoler .......................... | 301/104 |
| 4,844,552 A | * | 7/1989 | Tsygankov et al. .... | 301/64.702 |
| 5,810,453 A | * | 9/1998 | O'Brien ....................... | 301/59 |
| 6,024,413 A | * | 2/2000 | Dixon et al. ................. | 301/58 |
| 6,145,938 A | * | 11/2000 | Dietrich ....................... | 301/59 |
| 6,367,883 B1 | * | 4/2002 | Chen ............................ | 301/55 |
| 6,382,734 B1 | * | 5/2002 | Passarotto .................... | 301/55 |
| 6,386,644 B2 | * | 5/2002 | Chen ....................... | 301/110.5 |
| 6,409,278 B1 | * | 6/2002 | Nakajima .................... | 301/59 |

* cited by examiner

Primary Examiner—S. Joseph Morano
Assistant Examiner—Long Bao Nguyen
(74) Attorney, Agent, or Firm—Morgan, Lewis & Bockius LLP

(57) ABSTRACT

A spoked wheel includes a wheel hub, an annular wheel rim, and a plurality of spoke units which are connected between the wheel hub and the wheel rim. The wheel hub has left and right surrounding mounts with left and right sets of first anchored loci. The wheel rim has left and right annular wall portions opposite to each other in an axial direction and formed with left and right sets of second anchored loci. The spoke units are received and retained via the first and second sets of anchored loci. The spoke units do not include bent portions for fastening to increase the strength thereof.

7 Claims, 6 Drawing Sheets

SPOKED WHEEL FOR A BICYCLE

BACKGROUND OF THE INVENTION

1. Field of the Invention

This invention relates to a spoked wheel for a bicycle, more particularly to a spoked wheel with a plurality of spoke units that form coplanar planes.

2. Description of the Related Art

Referring to FIGS. 1 and 2, a conventional spoked wheel 100 for a bicycle having an axle defining an axis is shown to include an annular wheel rim 10, a wheel hub 20, and a plurality of spokes 30. The annular wheel rim 10 has a left annular rim wall 11 and a right annular rim wall 12 opposite to each other in an axial direction parallel to the axis of the axle. The left and right annular rim walls 11, 12 have a plurality of first mounting holes angularly displaced from one another about the axis. Moreover, the wheel hub 20 includes a left flange 21 and a right flange 22 opposite to each other in the axial direction. The left and right flanges 21, 22 have a plurality of second mounting holes angularly displaced from one another about the axis. The spokes 30 of a conventional spoked wheel 100 are hooked to the annular wheel rim 10 and the wheel hub 20 at corresponding ones of the first and second mounting holes. More particularly, the spoke 30A is connected to the left annular rim wall 11 and the right flange 22, while the spoke 30B is connected to the right annular rim wall 12 and the left flange 21. Furthermore, the spokes 30 have first bent portions 31, 32 which are inserted through the second mounting holes in the corresponding one of the left and right flanges 21, 22. The spokes 30 further have second bent portions 33, 34 which are inserted through the first mounting holes in the corresponding one of the left and right annular rim walls 11, 12.

The conventional spoked wheel 100 has several drawbacks. First, due to the spoke distribution, when under stress as shown in FIG. 3, there are situations where the forces are not fully counteracted by any spoke which would, consequently, cause an unbalanced feeling during riding. Second, due to the alternate spoke arrangement, a major portion of the force could not desirably propagate along the length of each of the spokes on which the force is applied. In other words, the spoke bracing effect is not maximized. Last but not least, the forces tend to focus on the bent portions of the spokes 30 where deformation or breakage of the spokes 30 or wheel rim 10 would easily occur. Thus, the rigidity of the annular wheel rim 10 in a direction radial to the axis is relatively poor.

SUMMARY OF THE INVENTION

The object of the present invention is to provide a spoked wheel for a bicycle with unbent spokes presented in pairs to increase the strength of the wheel and to balance the forces applied onto the wheel.

According to this invention, a spoked wheel is adapted for use in a bicycle which has an axle defining an axis, and comprises a wheel hub which has an inner hub wall surface adapted to be rotatably mounted on the axle about the axis, and an outer hub wall surface opposite to the inner hub wall surface in radial directions. The outer hub wall surface includes left and right surrounding ends opposite to each other in an axial direction parallel to the axis. Left and right flanges extend in radial directions respectively from the left and right surrounding ends, and terminate respectively at left and right surrounding edges which are spaced apart from each other in the axial direction. Left and right surrounding mounts extend in the axial direction respectively from the left and right surrounding edges, and have left and right sets of first anchored sites, respectively. Each of the left and right sets of first anchored sites includes a plurality of first anchored loci angularly displaced from one another about the axis. An annular wheel rim is disposed to surround the wheel hub about the axis, and includes an annular rim wall surrounding and facing towards the outer hub wall surface. The annular rim wall includes left and right annular wall portions opposite to each other in the axial direction. The left and right annular wall portions have left and right sets of second anchored sites, respectively. Each of the left and right sets of second anchored sites includes a plurality of second anchored loci which are angularly displaced from one another about the axis. Each of left and right sets of spokes has a plurality of spoke units. Each of the spoke units includes proximate and distal anchoring ends which respectively engage a corresponding one of the first anchored loci and a corresponding one of the second anchored loci to form a plane such that left and right planes respectively formed by a corresponding pair of the first anchored loci, a corresponding pair of the second anchored loci, a corresponding pair of the proximate anchoring ends, and a corresponding pair of the distal anchoring ends, are coplanar with each other.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
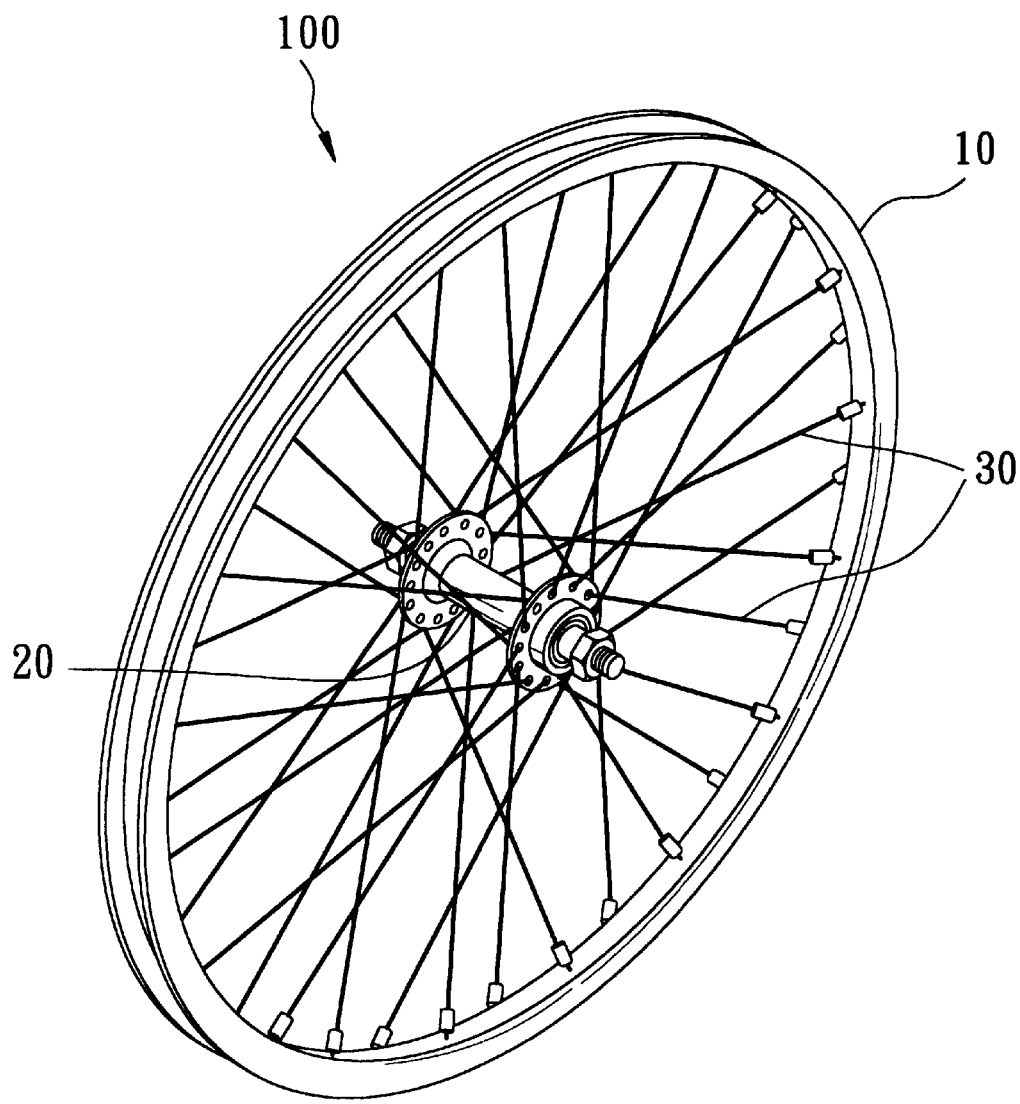
FIG. 1 is a perspective view of a conventional spoked tight wheel for a bicycle.
Figure 2:
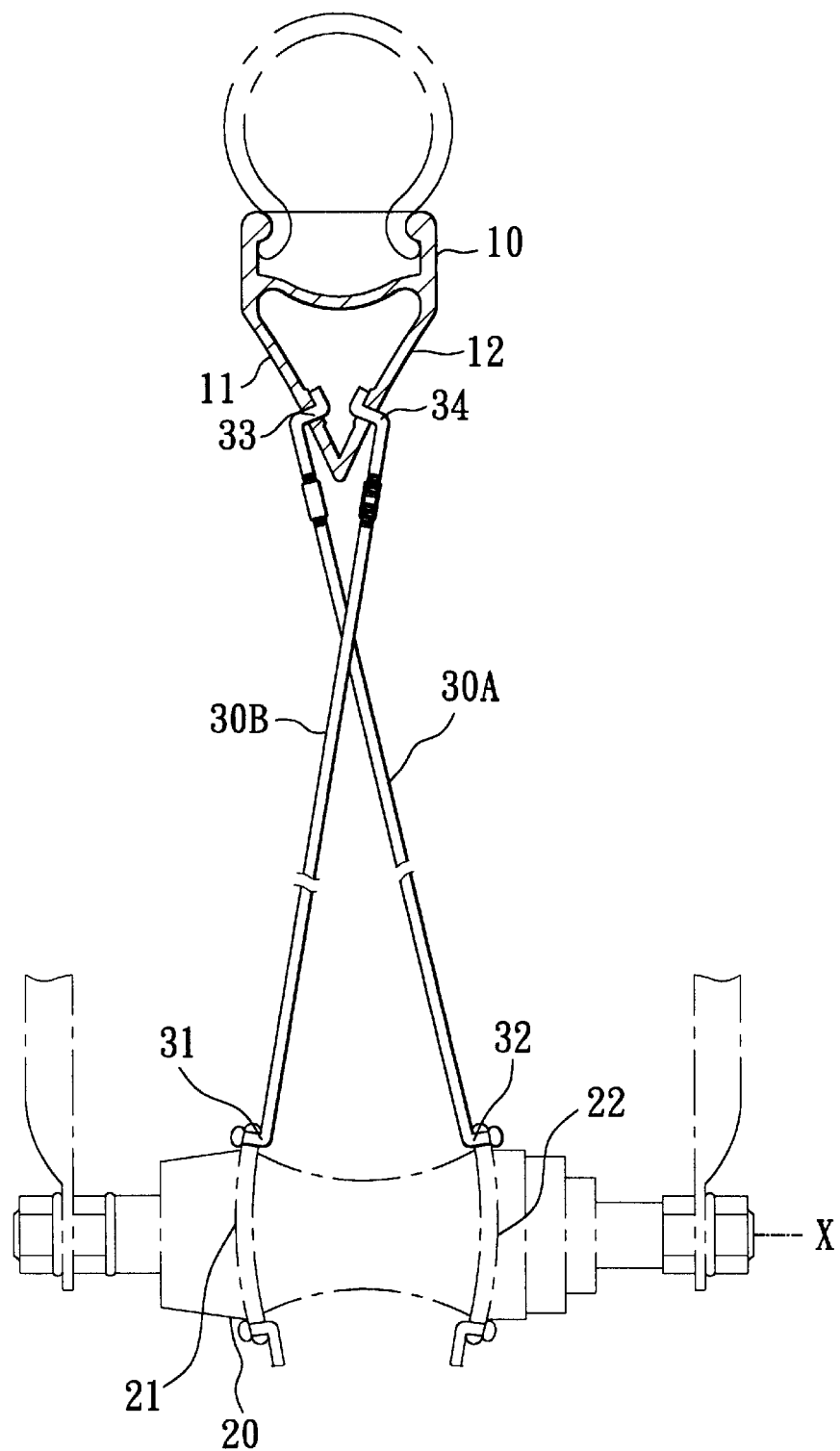
FIG. 2 is a schematic partially sectional view of a portion of the conventional spoked wheel of FIG. 1.
Figure 3:
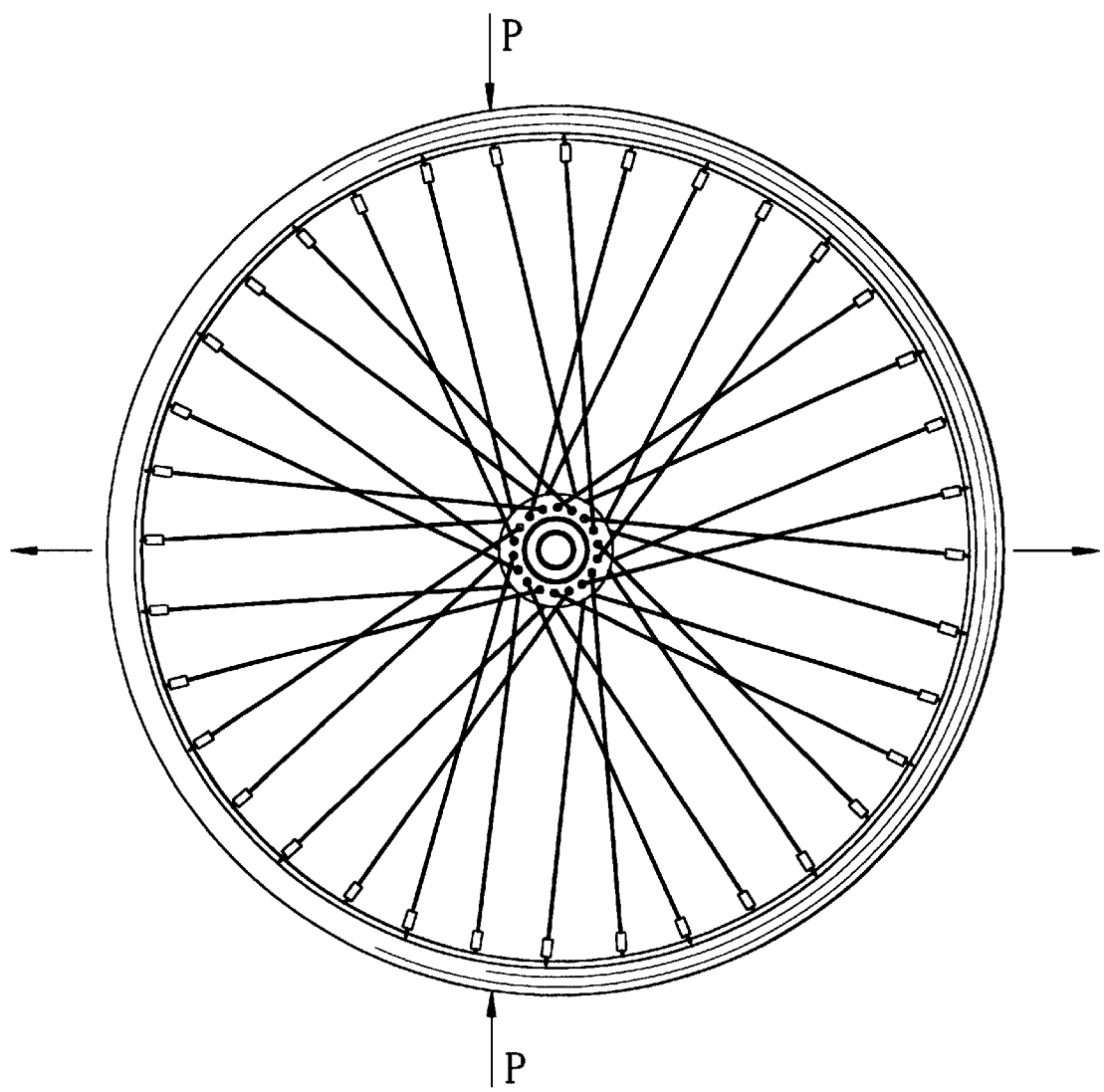
FIG. 3 is a schematic side view of the conventional spoked wheel of FIG. 1.
Figure 4:
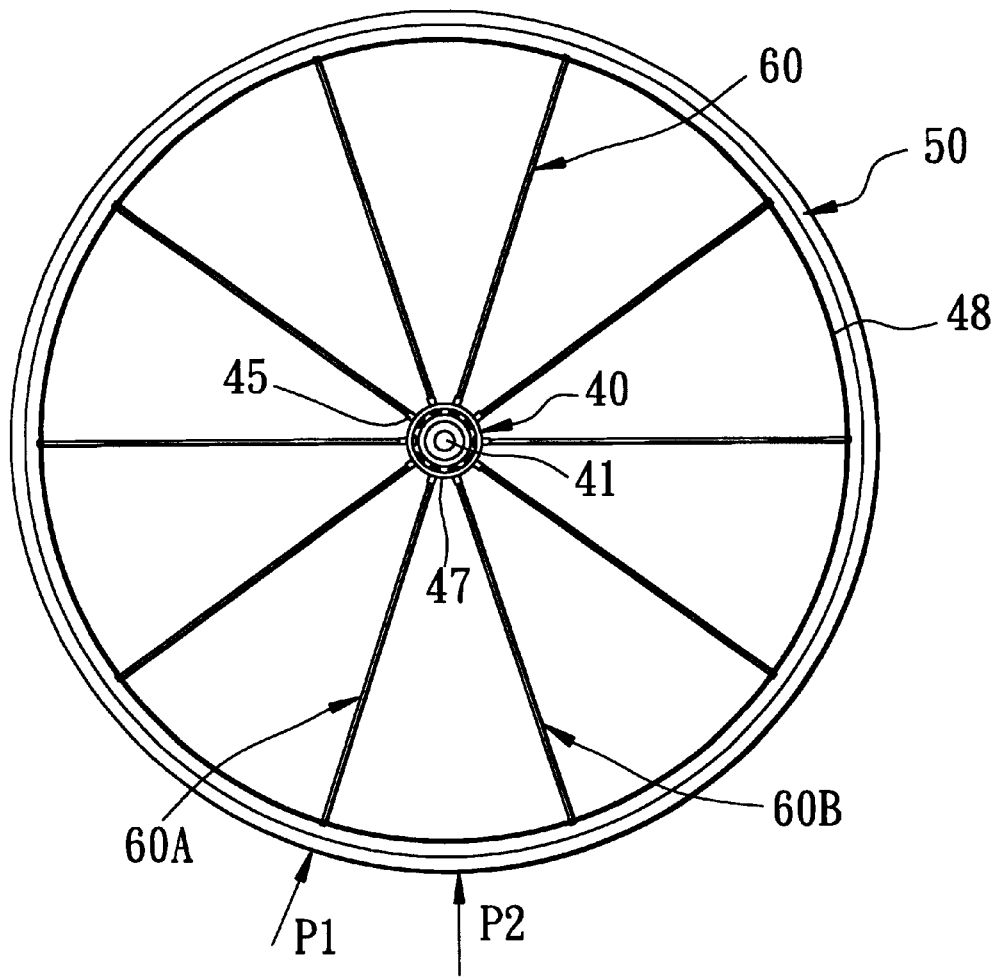
FIG. 4 is a schematic side view of the preferred embodiment of a spoked wheel according to the present invention.
Figure 5:
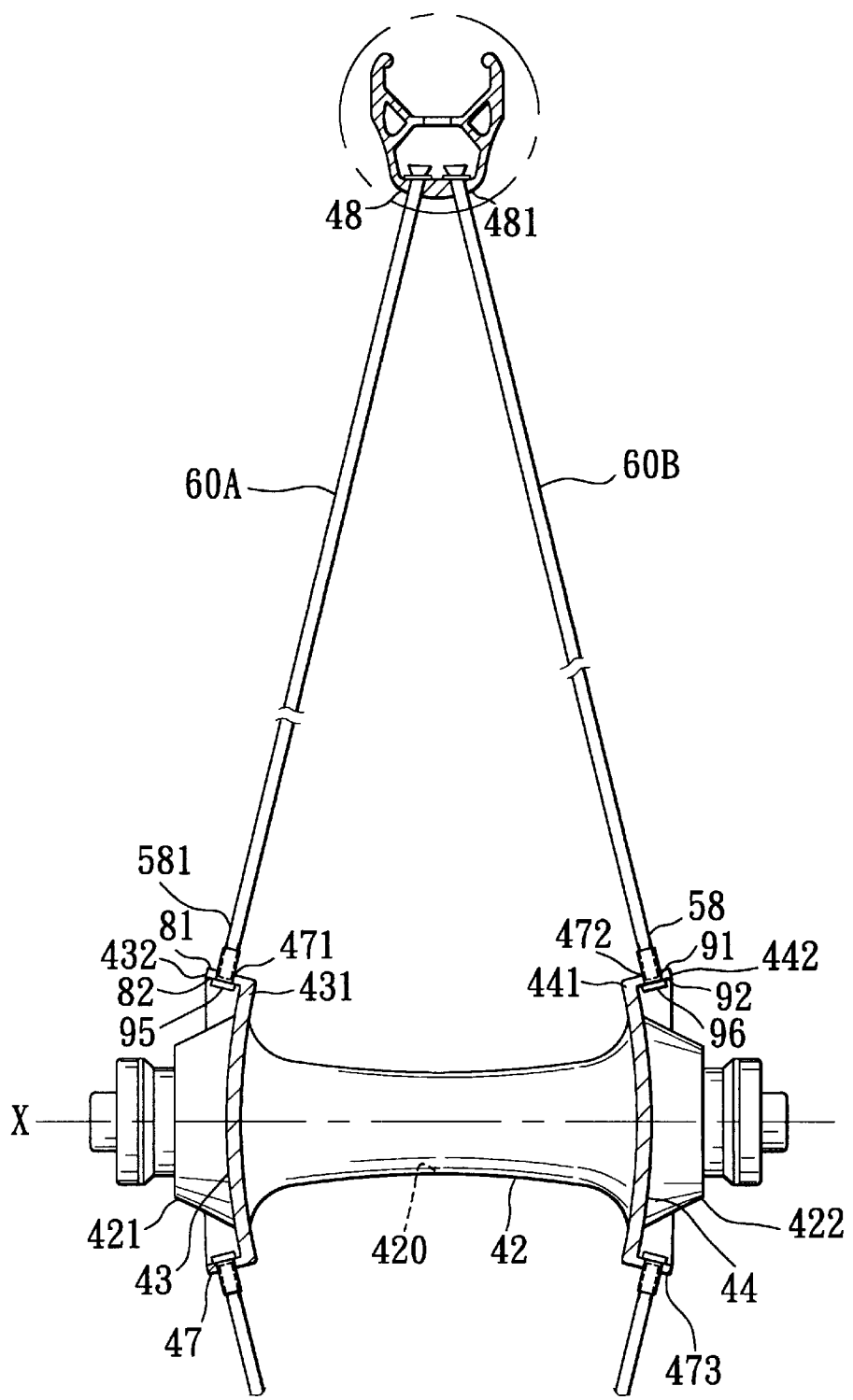
FIG. 5 is a schematic sectional view of a portion of the preferred embodiment.
Figure 6:
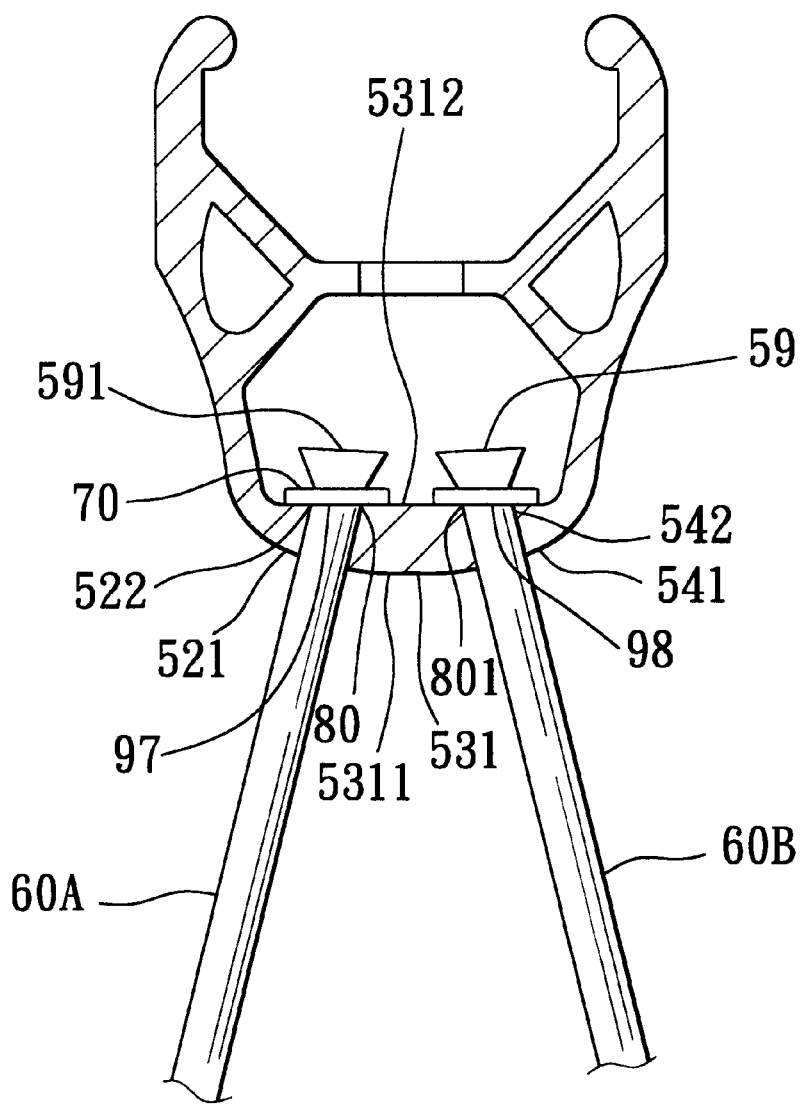
FIG. 6 is an enlarged view of an encircled portion shown in FIG. 5.

Referring to FIGS. 4, 5, and 6, the preferred embodiment of the spoked wheel according to this invention is to be used in a bicycle having an axle 41 defining an axis (X). The spoked wheel is shown to comprise a wheel hub 40, an annular wheel rim 50, a plurality of spokes 60, and washers 70. The wheel hub 40 includes an inner hub wall surface 420 and an outer hub wall surface 42. The inner hub wall surface 420 is adapted to be mounted rotatably on the axle 41 about the axis (X) in a conventional manner. The outer hub wall surface 42 is opposite to the inner hub wall surface 420 in radial directions. The outer hub wall surface 42 includes left and right surrounding ends 421, 422 opposite to each other in an axial direction parallel to the axis. Left and right flanges 43, 44 extend in radial directions respectively from the left and right surroundings ends 421, 422, and terminate respectively at left and right surrounding edges 431, 441 which are spaced apart from each other in the axial direction. Left and right surrounding mounts 432, 442 extend in the axial direction respectively from the left and right surrounding edges 431, 441. The left and right surrounding mounts 432, 442 have left and right sets of first anchored sites 47, 473. Each of the left and right sets of first anchored sites 47, 473 includes a plurality of left and right first anchored loci 471, 472, respectively. The first anchored loci 471, 472 are angularly displaced from one another about the axis (X). The annular wheel rim 50 is disposed to surround the wheel hub 40 about the axis (X), and includes an annular rim wall 531 surrounding and facing towards the outer hub wall surface 42. The annular rim wall 531 has left and right annular wall portions 521, 541 opposite to each other in the axial direction and having left and right sets of second anchored sites 48, 481, respectively. The left and right sets of second anchored sites 48, 481 include a plurality of left and right second anchored loci 522, 542, respectively, which are angularly displaced from one another about the axis (X). Furthermore, each of left and right sets of spokes 60 has a plurality of left or right spoke units 60A, 60B. Each pair of left and right spoke units 60A, 60B includes left and right proximate anchoring ends 581, 58 and left and right distal anchoring ends 591, 59 which respectively engage a corresponding one of the first anchored loci 471, 472, and a corresponding one of the second anchored loci 522, 542, to form left and right planes such that the left and right planes respectively formed by a corresponding pair of the first anchored loci 471, 472, a corresponding pair of the second anchored loci 522, 542, a corresponding pair of the proximate anchoring ends 581, 58, and a corresponding pair of the left and right distal anchoring ends 591, 59, are coplanar with each other.

Preferably, the left and right planes extend from the axis (X) in radial directions. Each of the spoke units 60A, 60B is adjustable along the length thereof relative to the corresponding ones of the first and second anchored loci 471, 472, 522, 542. More preferably, the annular rim wall 531 includes outer and inner rim surfaces 5311, 5312 opposite to each other in radial directions and proximate and distal to the outer hub wall surface 42, respectively. The second anchored loci 522, 542 have left and right insert holes 80, 801 extending through the outer and inner rim surfaces 5311, 5312. The left and right surrounding mounts 432, 442 have left and right upper mount surfaces 81, 91 and left and right lower mount surfaces 82, 92 opposite to each other in radial directions. The first anchored loci 471, 472 have left and right tightening holes 95, 96 extending through the upper mount surfaces 81, 91 and the lower mount surfaces 82, 92. The spoke units 60A, 60B are received and retained in a corresponding one of the left and right tightening holes 95, 96 and a corresponding one of the left and right insert holes 80, 801. Moreover, each of the left and right distal anchoring ends 591, 59 is enlarged such that once the spoke units 60A, 60B are inserted into the left and right insert holes 80, 801, the left and right distal anchoring ends 591, 59 are retainingly engaged in the left and right insert holes 80, 801. Furthermore, each of a plurality of tightening nuts 45 is disposed to threadedly engage the proximate anchoring end 581, 58 of a corresponding one of the spoke units 60A, 60B such that movement of the tightening nut 45 relative to the proximate anchoring end 581, 58 via threaded engagement will result in movement of the distal anchoring end 591, 59 toward the insert hole 80, 801 so as to abut against the corresponding one of the second anchored loci 522, 542 and tighten the corresponding one of the spoke units 60A, 60B. A plurality of washers 70 are sleeved respectively on the spoke units 60A, 60B between a corresponding one of the distal anchoring ends 591, 59 and a corresponding one of the second anchored loci 522, 542.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A spoked wheel for a bicycle which has an axle defining an axis, comprising:

a wheel hub which has an inner hub wall surface adapted to be rotatably mounted on the axle about the axis, and an outer hub wall surface opposite to said inner hub wall surface in radial directions, said outer hub wall surface including left and right surrounding ends opposite to each other in an axial direction parallel to the axis;

left and right flanges extending in radial directions respectively from said left and right surrounding ends and terminating respectively at left and right surrounding edges which are spaced apart from each other in the axial direction;

left and right surrounding mounts extending in the axial direction respectively from said left and right surrounding edges, said left and right surrounding mounts having left and right sets of first anchored sites respectively, each of said left and right sets of first anchored sites including a plurality of first anchored loci angularly displaced from one another about the axis;

an annular wheel rim which is disposed to surround said wheel hub about the axis, and which includes an annular rim wall surrounding and facing towards said outer hub wall surface, said annular rim wall including left and right annular wall portions opposite to each other in the axial direction, said left and right annular wall portions having left and right sets of second anchored sites respectively, each of said left and right sets of second anchored sites including a plurality of second anchored loci which are angularly displaced from one another about the axis; and left and right sets of spokes, each set having a plurality of spoke units, each of said spoke units including proximate and distal anchoring ends which respectively engage a corresponding one of said first anchored loci and a corresponding one of said second anchored loci to form a plane such that left and right planes respectively formed by a corresponding pair of said first anchored loci, a corresponding pair of said second anchored loci, a corresponding pair of said proximate anchoring ends, and a corresponding pair of said distal anchoring ends, are coplanar with each other.

2. A spoked wheel according to claim 1, wherein said left and right planes extend radially from the axis.

3. A spoked wheel according to claim 2, wherein each of said spoke units is adjustable along the length thereof relative to the corresponding ones of said first and second anchored loci.

4. A spoked wheel according to claim 3, wherein said annular rim wall includes outer and inner rim surfaces opposite to each other in radial directions, and proximate and distal to said outer hub wall surface respectively, each of said second anchored loci having an insert hole which extends through said outer and inner rim surfaces, each of said left and right surrounding mounts having upper and lower mount surfaces opposite to each other in radial directions, each of said first anchored loci having a tightening hole extending through said upper and lower mount surfaces, said proximate and distal anchoring ends of each of said spoke units being respectively received and retained in a corresponding one of said tightening holes and a corresponding one of said insert holes.

5. A spoked wheel according to claim 4, wherein each of said distal anchoring ends is enlarged such that once said spoke units are inserted into said insert holes, said distal anchoring ends are retainingly engaged in said insert holes.

6. A spoked wheel according to claim 5, further comprising a plurality of tightening nuts, each disposed to threadedly engage said proximate anchoring end of a corresponding one of said spoke units such that movement of said tightening nut relative to said proximate anchoring end via threaded engagement will result in movement of said distal anchoring end towards said insert hole so as to abut against said corresponding one of second anchored loci and tighten said corresponding one of said spoke units.

7. A spoked wheel according to claim 6, further comprising a plurality of washers sleeved respectively on said spoke units between a corresponding one of said distal anchoring ends and a corresponding one of said second anchored loci.

* * * * *